US012810901B1

(12) United States Patent
Shultz

(10) Patent No.: US 12,810,901 B1
(45) Date of Patent: Nov. 24, 2026

(54) SYSTEMS AND METHODS FOR GENERATING VIDEO CONTENT FROM TEXT USING NARRATION DURATION-BASED TIMING

(71) Applicant: Larry M. Shultz, Beverly Hills, CA (US)

(72) Inventor: Larry M. Shultz, Beverly Hills, CA (US)

( * ) Notice: Subject to any disclaimer, the term of this patent is extended or adjusted under 35 U.S.C. 154(b) by 26 days.

(21) Appl. No.: 19/530,256

(22) Filed: Feb. 4, 2026

(51) Int. Cl.
*G11B 27/031* (2006.01)
*G06F 40/30* (2020.01)
*G10L 13/033* (2013.01)
*G11B 27/10* (2006.01)

(52) U.S. Cl.
CPC ............ *G11B 27/031* (2013.01); *G06F 40/30* (2020.01); *G10L 13/033* (2013.01); *G11B 27/10* (2013.01)

(58) Field of Classification Search
CPC ....... G11B 27/031; G11B 27/10; G06F 40/30; G10L 13/033
USPC .......................................................... 386/285
See application file for complete search history.

(56) References Cited

U.S. PATENT DOCUMENTS 7,725,830 B2 * 5/2010 Vronay ................. G06F 40/169 715/730
8,832,555 B2 * 9/2014 Weber .................. G11B 27/034 715/730
8,922,713 B1 * 12/2014 Chakrovorthy .......... H04N 5/04 348/515
9,129,642 B2 * 9/2015 Axen ..................... G11B 27/34
9,177,407 B2 * 11/2015 Imbruce .................. G06T 13/80
9,213,705 B1 * 12/2015 Story, Jr. ............. G06F 16/4393
12,118,326 B1 * 10/2024 Shultz ..................... G06F 40/40
2003/0085913 A1 * 5/2003 Ahmad ................... G06F 16/40 715/730

(Continued)

OTHER PUBLICATIONS

Bharathi et al. "Text to Video Generation using Natural Language Processing and Machine Learning", 2024 4th Asian Conference on Innovation in Technology (ASIANCON), IEEE, Aug. 23-25, 2024, 7 pages (Year: 2024).*

(Continued)

*Primary Examiner* — Susan E. Hodges

(57) ABSTRACT

A computer-implemented system and method for generating documentary-style video content from textual input. The system receives textual content and a display time parameter specifying average seconds per visual element. A large language model processes the input and an AI text-to-audio generator produces an AI-narrated audio file. A processor calculates required visual elements using the formula R=(N×60)/S, where N is narration duration and S is display time in seconds, producing a deterministic count before retrieval begins. An image search engine retrieves semantically matched visual elements from multimedia databases. An AI-based video generator synchronizes narrated audio with visual elements to produce video output. A unified timing architecture uses narration duration as master parameter governing visual element count, scene durations, music synchronization, text overlays, and transitions. The system supports multi-voice narratives including narrator, interview, dialogue, and hybrid formats, incorporating semantic-emotional analysis with hierarchical relevance scoring for visual element selection.

26 Claims, 8 Drawing Sheets

(56) References Cited

U.S. PATENT DOCUMENTS

| | | | | |
|---|---|---|---|---|
| 2010/0161541 | A1* | 6/2010 | Covannon | G06F 16/436 706/47 |
| 2012/0177345 | A1* | 7/2012 | Trainer | H04N 21/234336 704/260 |
| 2017/0032823 | A1* | 2/2017 | Rav-Acha | G10L 15/08 |

OTHER PUBLICATIONS

Mo et al. "Text-to-Audio Generation Synchronized with Videos", arXiv preprint arXiv:2403.07938v1, Mar. 8, 2024, 11 pages (Year: 2024).*

* cited by examiner

SYSTEMS AND METHODS FOR GENERATING VIDEO CONTENT FROM TEXT USING NARRATION DURATION-BASED TIMING

CROSS-REFERENCE TO RELATED APPLICATIONS

This application is a continuation-in-part of U.S. patent application Ser. No. 18/985,495, filed Dec. 18, 2024, entitled "An Artificial Intelligence-Based Text-to-Video Messaging System, Application and Method," the entire disclosure of which is incorporated herein by reference.

FIELD OF THE INVENTION

The present invention relates to computer-implemented systems and methods for automated generation of video content from textual input using artificial intelligence. More specifically, the present invention relates to the field of AI-driven multimedia content production, including text-to-audio conversion, semantic image retrieval, and automated video assembly for documentary-style and news-style video formats.

BACKGROUND OF THE INVENTION

In the digital age, the consumption habits of citizens have undergone a significant transformation. Traditional forms of media such as newspapers, magazines, and even online publications are being sidelined in favor of video content. The preference for video content is not merely a trend; it is a fundamental change in how information is consumed.

Videos are more engaging, accessible, and easier to understand than written text. They cater to the fast-paced lifestyle of modern citizens who often prefer to watch a brief video rather than read an article.

Social media platforms with text-based and video-based formats have become integral to modern communication. This massively growing audience of social media users and viewers prefers to watch videos instead of reading printed newspapers or magazines. Increasingly, the growing new generation of citizen-consumers gets their news and information from online video platforms inundated with misinformation and disinformation. This shift from traditional news sources has led to a concerning issue: the inability of many users to discern between real news online and misinformation. Studies have shown that purposeful lies, propaganda, misinformation, and disinformation are rampant on these platforms, influencing public opinion and swaying real-life decisions based on incorrect or incomplete information.

This shift in media consumption necessitates a corresponding change in how corporations and the government communicate with the public, and this shift presents a unique challenge for the government, which relies heavily on written communication to disseminate important information. Therefore, there is a public need to replace social media misinformation and disinformation with fact-checked news and information from reliable journalistic newspapers and media resources on social media to more effectively reach, engage, appeal to, and inform younger social media users of the real news and current events happening locally, nationally and globally.

At the same time, the traditional newspaper and magazine industries are also in crisis in the digital age. Declining readership and profitability coincide with the rise of internet and social media platforms that have fundamentally changed how important news, articles, or editorials concerning political as well as social issues are consumed. Younger generations Gen Y, Gen Z, and Gen Alpha are increasingly relying on digital video platforms like TikTok, YouTube, and Instagram for their information, leading to a significant drop in print subscriptions and advertising revenues. According to research published in the Journal of Experimental Psychology: Learning, Memory, and Cognition, visual information is mapped better in the brain, leading to improved recall by transitioning information from working memory to long-lasting memory, making it easier to remember the content.

Unfortunately, online platforms often lack the journalistic integrity of traditional outlets and are inundated with misinformation and disinformation, which undermines the credibility of public discourse. This environment fosters a dangerous landscape where opinions are shaped by sensationalism rather than facts, leaving younger audiences uninformed or misinformed about crucial issues and candidates. As a result, this contributes to apathy and disengagement from the democratic process, presenting a significant challenge for traditional media to reclaim their role as trusted sources of news while combating the spread of false information that threatens informed citizenry.

The declining consumption of traditional news content among younger audiences also coincides with a disturbing trend in education: a decline in reading comprehension scores. Data from the National Assessment of Educational Progress (NAEP) shows that reading scores among 9-year-olds dropped by five points from 2020 to 2022, marking the largest decline in decades.

Meanwhile, the rapid development of artificial intelligence and machine learning technologies has created significant opportunities for innovation across various sectors, including media, entertainment, and education. The global conversational AI market was valued at over $7.6 billion in 2022 and is projected to grow at an impressive compound annual growth rate of 23.6% through 2030. As AI continues to become more advanced, media organizations have started exploring its use for content creation, distribution, and audience engagement, offering new ways to address declining readership while improving operational efficiencies.

There is therefore a pressing need for an AI-managed video clip library descriptor system that leverages the power of advanced semantic-matching and language models to analyze and break down video content with unprecedented precision and then assign predetermined intensity values for one or more video clip descriptor categories by which every video clip scraped, scanned, or played is labeled for future identification and use. This allows for the creation of meticulously curated descriptors that can capture every aspect of a video scene, from the type of action taking place to the specific lighting conditions and background elements, ensuring unparalleled accuracy in identifying and categorizing video clips.

There is further a clear and pressing need to bridge the gap between traditional news organizations and the digital consumption habits of younger generations by engaging young generations in a format that they prefer while simultaneously improving their reading comprehension and knowledge retention.

There is also a pressing need to leverage AI for an AI-driven Fact-Check and Truth-Reliability assessment to check the integrity of the AI-generated content for circulation by the users, and to blacklist websites that are known for spreading fake news and use the generated list of blacklisted websites to generate videos that refute misinformation with verified facts.

There is also a clear and pressing need to overcome the problem of declining reading scores of the younger generation by increasing comprehension of educational and informational video content through the display of keyword phrases and quotations from the narration as text-graphics to capture and maintain the viewer's attention, leveraging the dual-coding theory, which posits that information is more easily learned and retained when combining visual images and auditory narration that engages different parts of the brain, reinforcing information comprehension and improving long-term retention.

There is further a pressing need to incorporate statistical, financial, and informational drawings, pictures, slides, maps, charts, tables, and graphs as images in informational and educational text-to-videos because they cater to the visual learning style of many individuals, making complex information more accessible and memorable, thereby leading to improved recall by transitioning information from working memory to long-lasting memory.

Additionally, there exists a fundamental challenge in video production known as the "first cut" problem. When a video producer, whether human or automated, begins assembling a documentary-style video from written content, the producer faces a blank timeline with no visual elements and no objective basis for determining how many images, graphics, or video segments will be needed. Traditional video production relies on subjective editorial judgment to estimate the number of visual elements, resulting in unpredictable workflows, wasted retrieval operations, and the need for extensive manual revision.

Several approaches have been proposed to automate various aspects of video creation from textual or multimedia inputs, but each addresses only a subset of the documentary assembly problem and none provides a deterministic, formula-driven methodology for calculating the precise number of visual elements required before retrieval and assembly begin.

Vronay, in U.S. Pat. No. 7,725,830 B2, titled "Assembling Verbal Narration for Digital Display Images" and assigned to Microsoft Corporation, disclosed a system for creating narrated sequences from still photographs by combining spontaneous verbal narration with automatic cinematic display manipulations such as pans, zooms, and fades. The Vronay system divides each image into a grid of subregions, identifies starting and ending segments based on where a user points during narration, and applies rule-based transitions where the duration of cinematic manipulation equals the duration of narration for that particular display image. However, the Vronay system operates on a single-image-at-a-time basis, dynamically adjusting how long and how each individual image is displayed rather than calculating how many total images are needed for a given narration duration. The system relies on manual user pointing for subject identification rather than automated semantic retrieval from a database, and it does not pre-compute the total number of visual elements required for a narration of known duration.

Wilesick et al., in U.S. Patent Application Publication No. 2012/0177345 A1, titled "Automated Video Creation Techniques," disclosed a system for automatically creating videos from text by identifying subject matter, locating corresponding images, selecting music, generating a spoken version of the text using text-to-speech conversion, and combining these elements into a video. While the Wilesick system addresses the general workflow of converting text to video, it does not disclose a mathematical formula for calculating the required number of visual elements based on narration duration, nor does it provide a deterministic pre-retrieval calculation that tells the system exactly how many images must be sourced before assembly begins. The image selection in Wilesick is driven by subject-matter matching without a quantitative constraint tying the number of selected images to the narration timeline.

SundaRajan et al., in U.S. Pat. No. 9,129,642 B2, titled "Automatic Generation of Video from Structured Content," disclosed apparatus and methods for automatically generating video content from flat content by extracting media elements such as images, videos, audio, animation, and text from repositories or databases and assembling them into video-like productions that include scene changes, camera instructions, and filler material according to a storyboard. The SundaRajan system uses known structural details of a source database to help structure the video automatically. However, SundaRajan does not teach using narration duration as a master timing parameter, does not disclose a formula for computing the number of visual elements required, and does not address the specific problem of documentary assembly where visual elements must be synchronized to a narrated audio track of deterministic duration.

Bowen, in U.S. Patent Application Publication No. 2017/0032823 A1, titled "System and Method for Automatic Video Editing with Narration," disclosed a method for automatic video editing that obtains a plurality of media entities, analyzes them to produce content-related metadata, automatically selects media portions, receives a narration from a user, and automatically combines the narration with selected media portions to yield a narrated video production. The Bowen system addresses the challenge of integrating user-supplied narration with pre-existing media, but it does not disclose calculating a required number of visual elements from narration duration, nor does it provide a deterministic formula-driven approach where the narration duration mathematically governs all downstream timing parameters.

Morales et al., in U.S. Pat. No. 9,177,407 B2, titled "Method and System for Assembling Animated Media Based on Keyword and String Input," disclosed a system that evaluates user search terms and assembles multimedia presentations on the fly, including narrated definitions and answers with text-to-speech integration, music selection based on keyword analysis, and coordinated visual content. While Morales addresses automated assembly of narrated multimedia presentations, the system does not disclose a mathematical relationship between narration duration and the number of visual elements required, and it selects music by keyword matching rather than deriving music duration from a master narration timing parameter.

In the area of content-synchronized presentation, Audible Inc. disclosed in U.S. Pat. No. 9,213,705 B1, titled "Presenting Content Related to Primary Audio Content," a system that determines keywords from narration audio at specific time marks and retrieves images associated with those keywords for display alongside the audio content. While this system addresses the retrieval of visual content synchronized to narration, it operates in a supplementary display mode for audiobooks and does not calculate the total number of visual elements needed for a complete video assembly, nor does it generate a self-contained documentary-style video output.

Timing and synchronization approaches in the prior art have addressed various aspects of audio-visual coordination but have not solved the pre-assembly cardinality problem. Apple Inc., in U.S. Pat. No. 8,832,555 B2, disclosed subtraction-based timing where effective duration equals total duration minus transition duration, incorporating audio profiling parameters to dynamically adjust effect durations. Beat-based timing approaches, such as those disclosed in U.S. Patent Application Publication No. 2003/0085913 A1, calculate transition points based on musical beats and temporal offsets, synchronizing image changes to music rather than narration. Amazon Technologies, in U.S. Pat. No. 8,922,713 B1, disclosed pipeline latency compensation through adjusted timestamps for maintaining audio-video alignment during playback. These approaches respectively address transition overlap calculation, music-driven image pacing, and real-time synchronization compensation none of which pre-computes the total number of images required for a narration of known duration before assembly begins.

In the academic literature, Bharathi et al., in "Text to Video Generation using Natural Language Processing and Machine Learning," presented at the 2024 4th Asian Conference on Innovation in Technology (ASIANCON), IEEE, 2024, described a system for converting text to video using natural language processing techniques including BERT-based text summarization. However, the Bharathi system focuses on AI-based pixel synthesis to generate video frames from text descriptions rather than assembling pre-existing verified images into a documentary sequence, and it does not disclose any mathematical formula relating narration duration to the number of visual elements required.

Mo et al., in "Text-to-Audio Generation Synchronized with Videos," arXiv preprint arXiv:2403.07938 (2024), addressed the inverse problem of generating audio content synchronized to pre-existing video using visual-aligned contrastive language-audio pretraining. The Mo system requires visual features as input to generate audio output, which is fundamentally the opposite direction from the present invention where narration audio drives the determination of visual element requirements. Mo does not teach or suggest using narration duration as a master timing parameter to calculate visual element quantities.

Despite the foregoing developments in automated video production, AI-driven content creation, and multimedia synchronization, a significant gap remains in the prior art. No known system provides a deterministic mathematical formula that calculates the exact number of visual elements required for a documentary-style video based on the total narration duration divided by a user-selected display time parameter, where this calculation is performed before any visual element retrieval or assembly begins, and where the narration duration serves as a master timing parameter from which all other temporal relationships in the video are mathematically derived. There is a pressing need for such a deterministic, mathematically grounded method for calculating the exact number of visual elements required for a documentary-style video before any retrieval or assembly begins, thereby transforming a subjective creative estimation into an objective, reproducible computation. The present invention addresses this gap and the foregoing needs.

The Applicant is aware of U.S. Patent Application Publication No. US 2010/0161541 A1 (Covannon) and U.S. Pat. No. 12,118,326 B1 (Shultz). These references are cited for informational purposes only. Nothing in this Background section shall be construed as an admission that any reference is prior art to the present claims, that any reference is material to patentability, or that any reference accurately characterizes the state of the art.

SUMMARY OF THE INVENTION

It will be understood that this disclosure is not limited to the particular systems and methodologies described, as there can be multiple possible embodiments of the present disclosure which are not expressly illustrated in the present disclosure. It is also to be understood that the terminology used in the description is to describe the particular versions or embodiments only, and is not intended to limit the scope of the present disclosure.

In accordance with an aspect of the present invention, a computer-implemented system for generating documentary-style video content from textual input is disclosed. The system comprises a user interface configured to receive one or more inputs comprising textual content, digital documents, or network addresses, and further configured to receive a display time parameter specifying an average display time in seconds per visual element.

In an embodiment, the system comprises at least one pre-trained large language model configured to process the received inputs and generate processed textual output based on contextual analysis, wherein the language model utilizes data from a Knowledge Base comprising structured and unstructured content from diverse sources, including subject-based data, people-based data, geospatial-location data, financial and transactional data, sensor data, non-numeric qualitative data, numeric quantitative data, administrative data, and behavioral data, in text format, in image and video clip format, and statistical chart, table, and graph format from governmental, educational, corporate, non-profit organization, and private online resources, from one or more multimedia websites.

In another embodiment, the system includes a pre-trained embedding model configured to analyze input content and identify semantically relevant segments to enhance contextual understanding, wherein the language model utilizes the contextual information to generate a personalized draft text based on user-selected topics, existing source material, and customization preferences.

In yet another embodiment, the system includes an AI text-to-audio generator configured to convert processed textual output into an AI-narrated audio file having a total narration duration, using a user-selected narration voice and narration type.

In an embodiment, the system includes a processor configured to determine the total narration duration of the AI-narrated audio file and calculate a required number of visual elements by dividing the total narration duration in seconds by the display time parameter to produce a deterministic count of visual elements required for the video before visual element retrieval begins. In a further embodiment, the processor calculates the required number of visual elements R using the formula $R=(N\times 60)/S$, wherein R represents the required number of visual elements, N represents the total narration duration in minutes, the factor 60 converts minutes to seconds, and S represents the display time parameter in seconds per visual element.

In an embodiment, the system also includes an image search engine configured to search one or more multimedia databases to retrieve the required number of visual elements, wherein each visual element semantically matches contextual information derived from the narrated content.

In a further embodiment, the system includes an AI-based text-to-graphics generator configured to identify and display semantically relevant textual elements as visual overlays synchronized with the AI-narrated audio.

In another embodiment, the system includes an AI-based video generator configured to synchronize the AI-narrated audio with the required number of visual elements, each visual element displayed for the display time parameter, and generate a video output suitable for distribution via user-selected digital platforms.

In an embodiment, the content modifiers are selected by the user for adding online information links to the message knowledge base, selecting a theme or tone of the narrated video, selecting a preferred duration of video length, selecting a graphical-text quotation-frequency, selecting the display time parameter, composing an Opening Title sequence text-content, composing an End Title sequence text-content, composing or selecting a final background music, and composing or selecting a final narration voice and narration type.

In a further embodiment, the AI text-to-audio generator is configured to process narrative content comprising one or more of a single narrator voice, multiple narrator voices, dialogue between two or more speakers, and interview segments comprising questions and answers from distinct speakers, and wherein the total narration duration used in calculating the required number of visual elements represents the total duration of a composite AI-narrated audio file including all speaker contributions and inter-speaker pauses.

In another embodiment, the system implements a unified timing architecture in which the total narration duration serves as a master timing parameter from which all temporal parameters of the video are mathematically derived, including the required number of visual elements, visual element display times and time window assignments, semantic scene boundaries and scene durations, background music selection and synchronization, text overlay timing, and transition effects, wherein each timing relationship flows deterministically from the master timing parameter and the display time parameter without requiring manual synchronization.

In yet another embodiment, the system comprises a semantic-emotional analysis subsystem configured to analyze emotional tone, narrative context, and persuasive intent of the narration text corresponding to each visual element position in the video timeline, and to use the analysis as additional search parameters when retrieving visual elements, including a hierarchical weighting scheme that assigns progressively greater weight to contextual-relevance matches, emotional-tone matches, and narrative-arc matches relative to literal-content matches.

In an embodiment, the knowledge base is continually updated with images, graphics, and video segments searched or retrieved by the LLM model that are identified, described, categorized and labeled with one or more attribute descriptors out of a plurality of unique descriptors, including but not limited to, an action description, location setting, main subjects of the scene, mood and atmosphere, an event type, duration of the clip, time of day, camera angle and shot type, sound and music characteristics, color tone, lighting conditions, genre, language, special effects and visual enhancements, costumes and attire descriptions, character interaction, directional movement pacing, weather conditions, historical context, theme, props, background elements, sound effects, speech patterns, cinematography style, narration presence, scene transition, editing style, symbolism, cultural references, and other differentiating image characteristics to improve accuracy of future image searches for video clips and images to be used in videos.

In an embodiment, the system further comprises an AI-based dynamic ad generator for dynamically selecting sponsor-related advertisements that match the contextual information of the written content and incorporating the advertisements in the AI-generated video.

In another aspect of the present invention, a computer-implemented method for generating documentary-style video content from textual input is disclosed. The method comprises receiving, via a user interface, one or more inputs comprising textual content and a display time parameter; processing the received textual content using at least one pre-trained large language model; converting the processed textual output into an AI-narrated audio file having a total narration duration; determining the total narration duration; calculating a required number of visual elements by dividing the total narration duration in seconds by the display time parameter to produce a deterministic count before visual element retrieval begins; searching one or more multimedia databases to retrieve the required number of visual elements; generating synchronized text overlays; and synchronizing the AI-narrated audio with the required number of visual elements to generate a video output.

In yet another aspect of the present invention, a computer-implemented method for analyzing integrity of information using an AI-based system interfaced with a Knowledge Base over a network is disclosed, comprising comparing summarized text content using an AI evaluator against a predetermined list of truth descriptors and assigning an integrity score for the summarized draft text based on the comparison results.

Various objects, features, aspects, and advantages of the inventive subject matter will become more apparent from the following detailed description of preferred embodiments, along with the accompanying drawing figures in which the same numerals represent like components.

BRIEF DESCRIPTION OF THE DRAWINGS

Non-limiting examples of the present disclosure will be described in the following disclosure with reference to the appended drawings, in which:

FIGS. 2A-2B illustrate a flow diagram for parsing and retrieving data from websites, according to an embodiment of the present invention.

FIG. 4 illustrates a flow diagram depicting a workflow of generating a personalized text-to-video, according to an embodiment of the present invention.

DETAILED DESCRIPTION OF THE INVENTION

Some embodiments of this invention, illustrating all its features, will now be discussed in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present invention, the preferred systems and methods are now described.

As used herein, the term "visual element" refers to any of an image, a graphic, a video segment, a statistical chart, a table, a graph, or any other visual media element suitable for display in synchronization with narrated audio content. The term "display time parameter" and the variable "S" refer to the average display time in seconds per visual element as selected by the user or set by the system as a default value. The term "narration duration" and the variable "N" refer to the total duration of the AI-narrated audio file, expressed in minutes unless otherwise specified. The term "required number of visual elements" and the variable "R" refer to the deterministic count of visual elements calculated by the system using the mathematical formula disclosed herein.

System Architecture and Network Configuration

Figure 1:
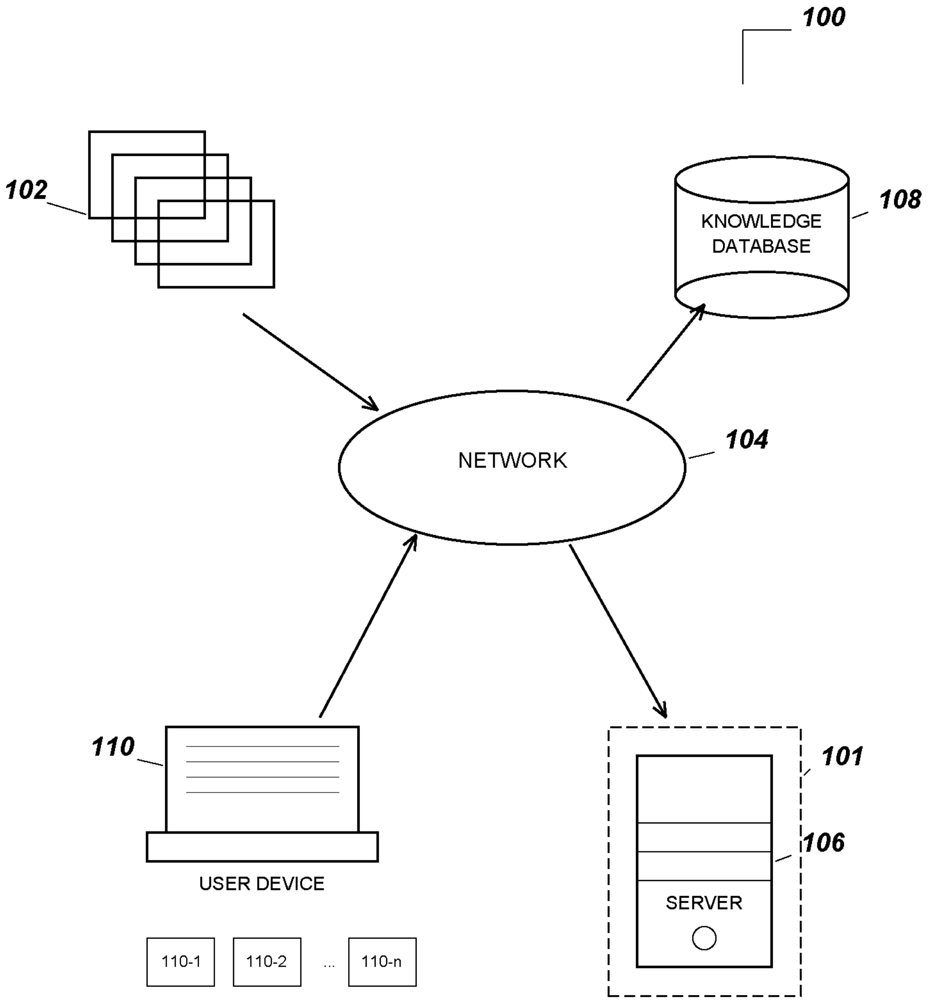
FIG. 1 illustrates an exemplary network diagram for implementing a computer-based system for AI-enhanced message creation and distribution, according to an embodiment of the present invention.
Figure 2A:
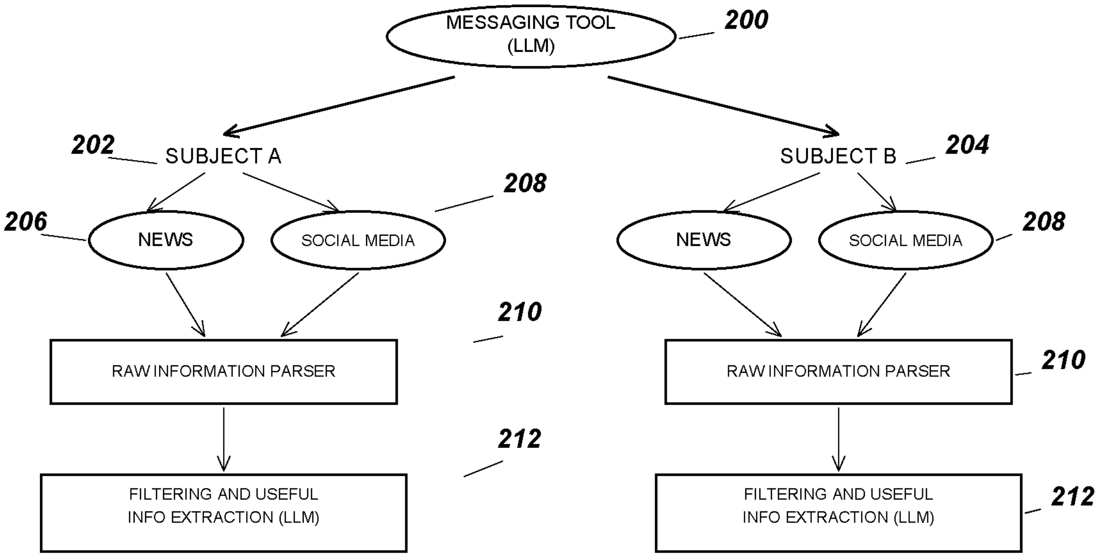
Figure 3A:
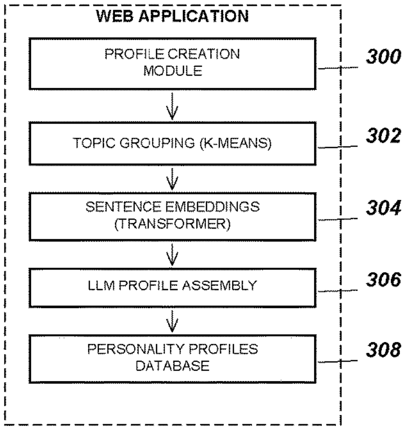
FIGS. 3A-3D illustrate a flow diagram for different modules of the web application of the system displayed on the user device, according to an embodiment of the present invention.
Figure 3B:
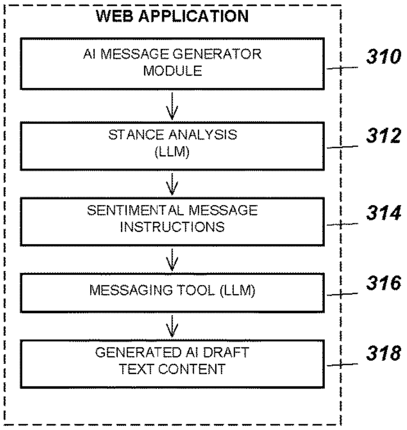
Figure 3C:
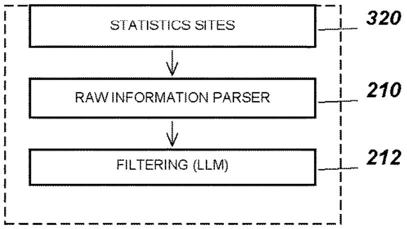
Figure 3D:
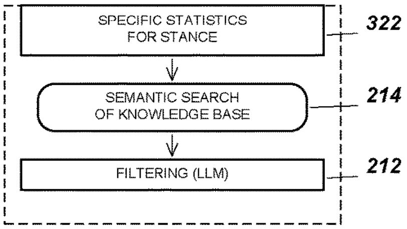
Figure 5:
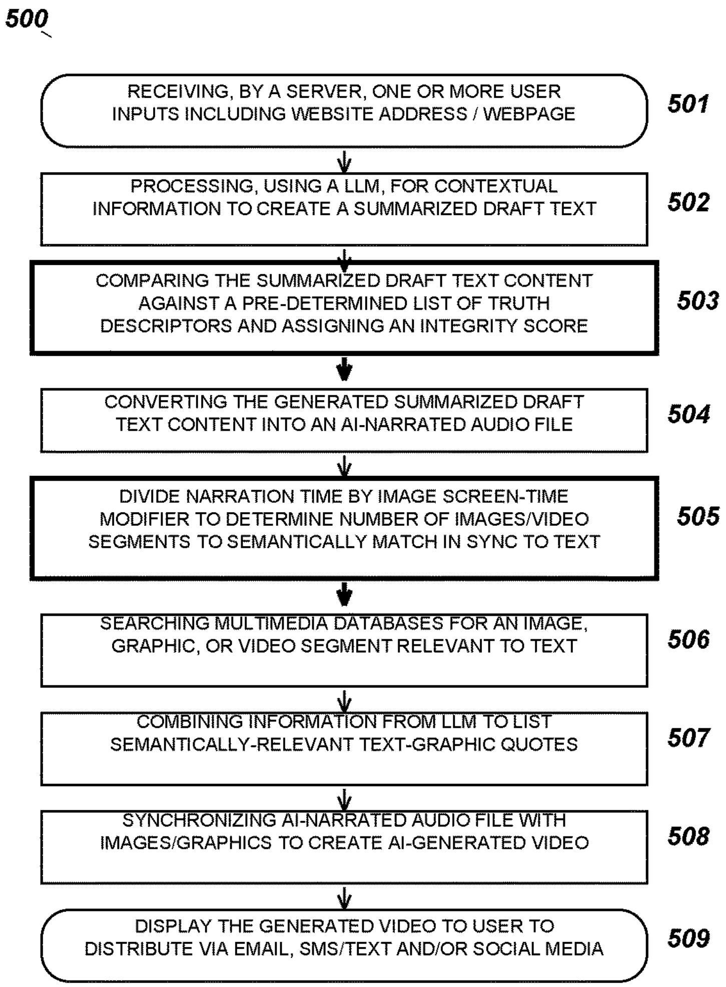
FIG. 5 illustrates a flow diagram depicting a workflow of detecting the integrity of information using a predetermined list of truth descriptors, according to an embodiment of the present invention.
Figure 6:
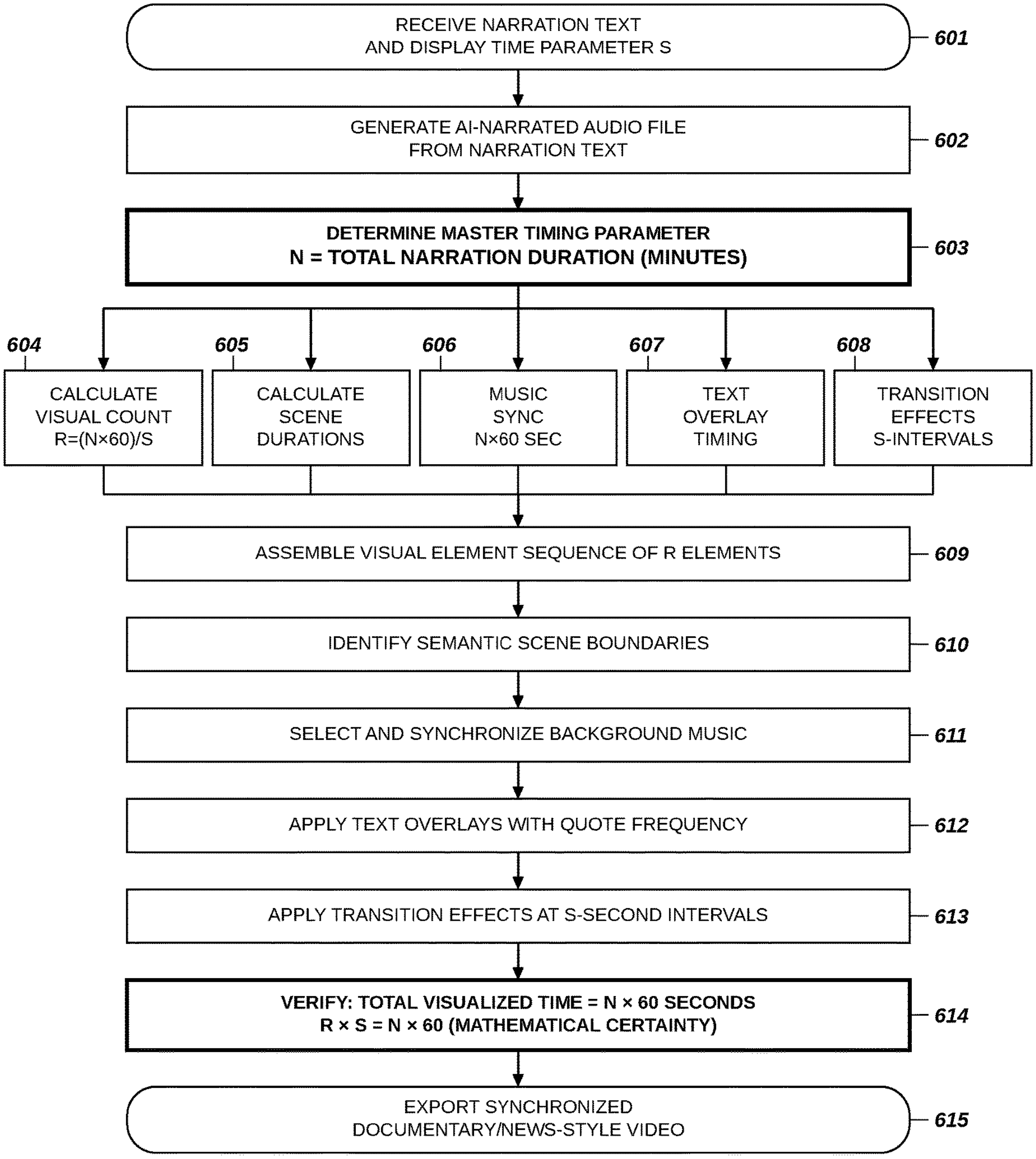
FIG. 6 illustrates a flow diagram depicting the unified timing architecture showing how the master timing parameter N governs the mathematical derivation of visual element count R, scene durations, music synchronization, text overlay timing, and transition effects, according to an embodiment of the present invention.
Figure 7:
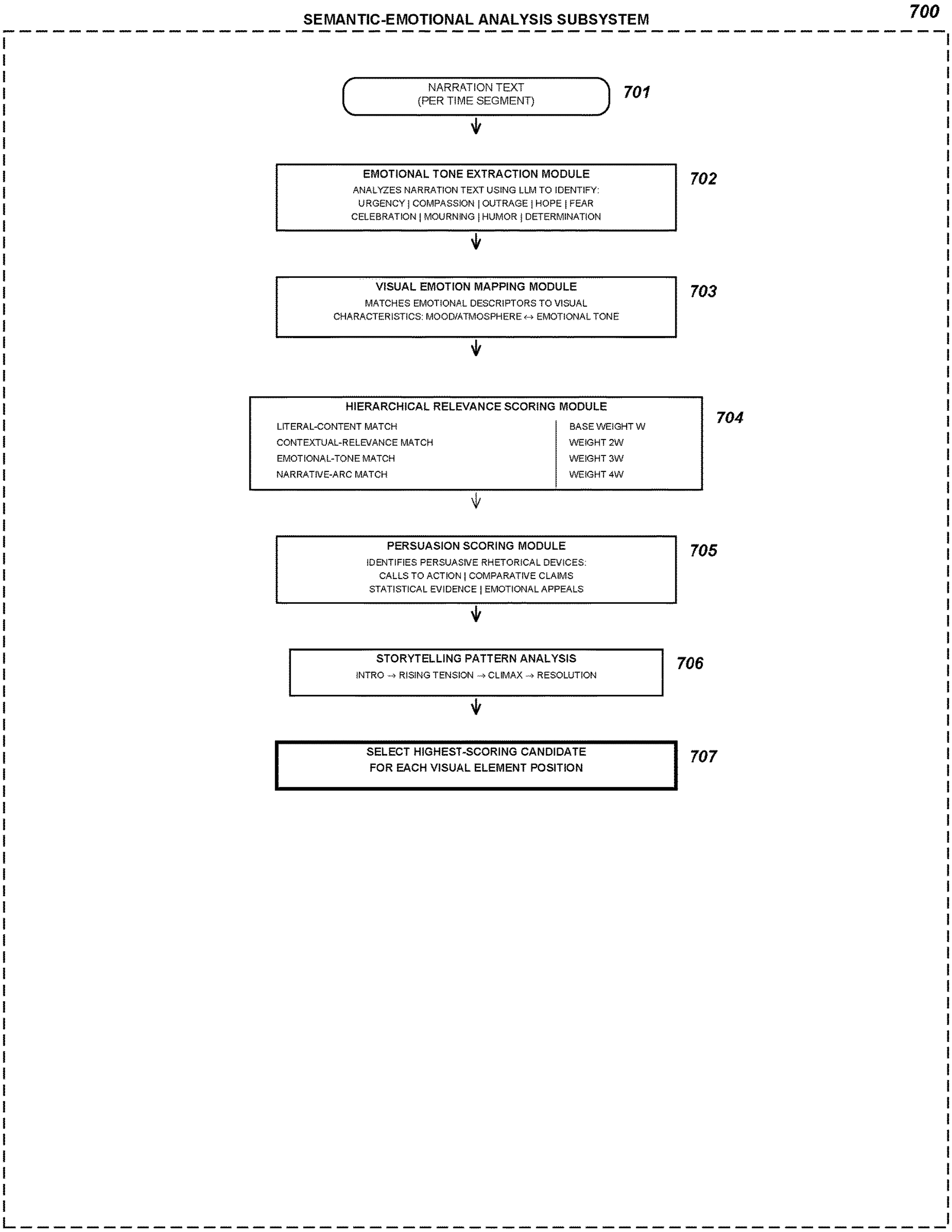
FIG. 7 illustrates a block diagram of the semantic-emotional analysis subsystem showing the emotional tone extraction module, the visual emotion mapping module, the hierarchical relevance scoring module, and the persuasion scoring module, according to an embodiment of the present invention.
Figure 8:
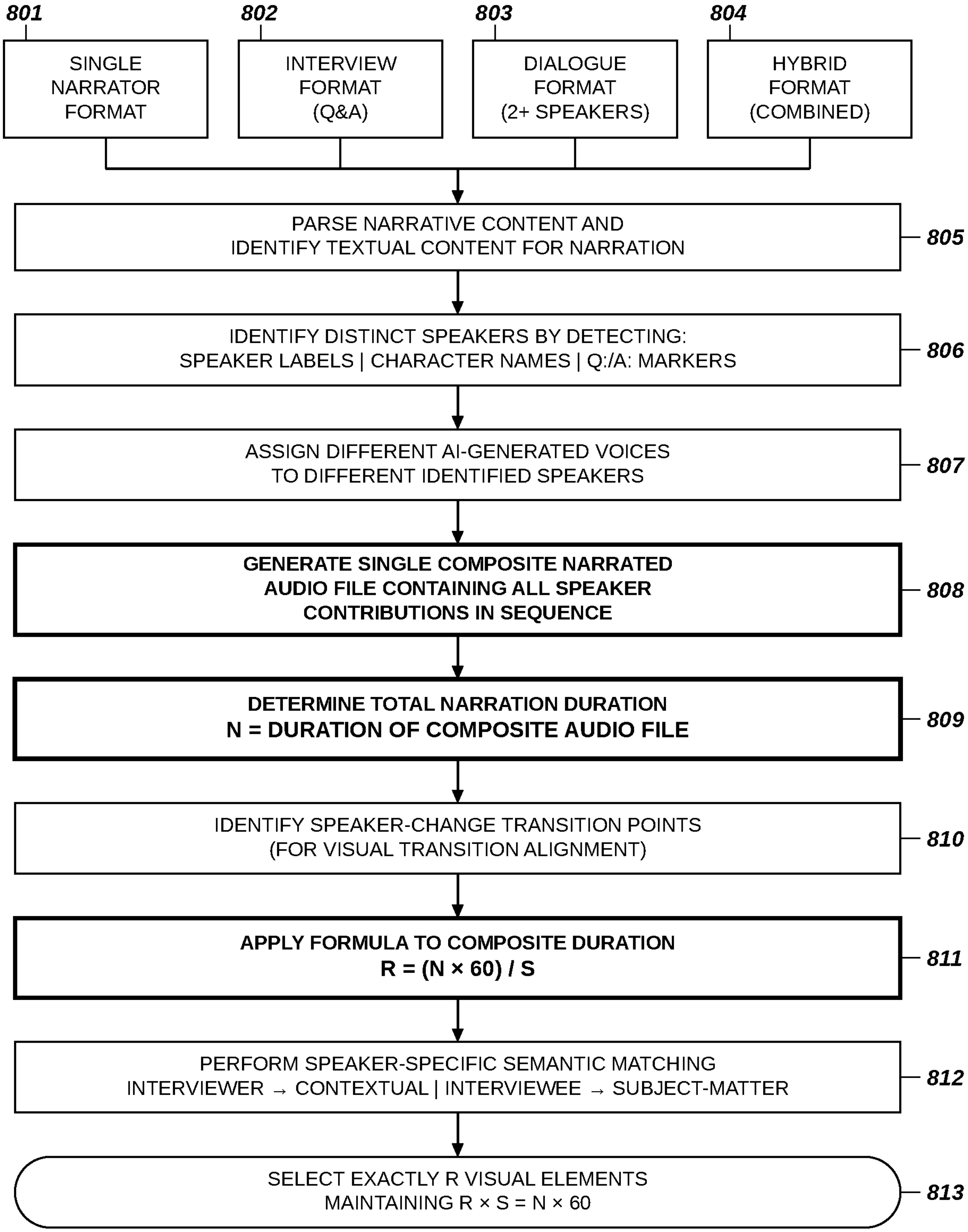
FIG. 8 illustrates a flow diagram depicting the multi-voice narrative processing pipeline showing how single narrator, interview, dialogue, and hybrid format inputs are processed into a composite narrated audio file and how the total narration duration N is determined from the composite file, according to an embodiment of the present invention.
Figure 9:
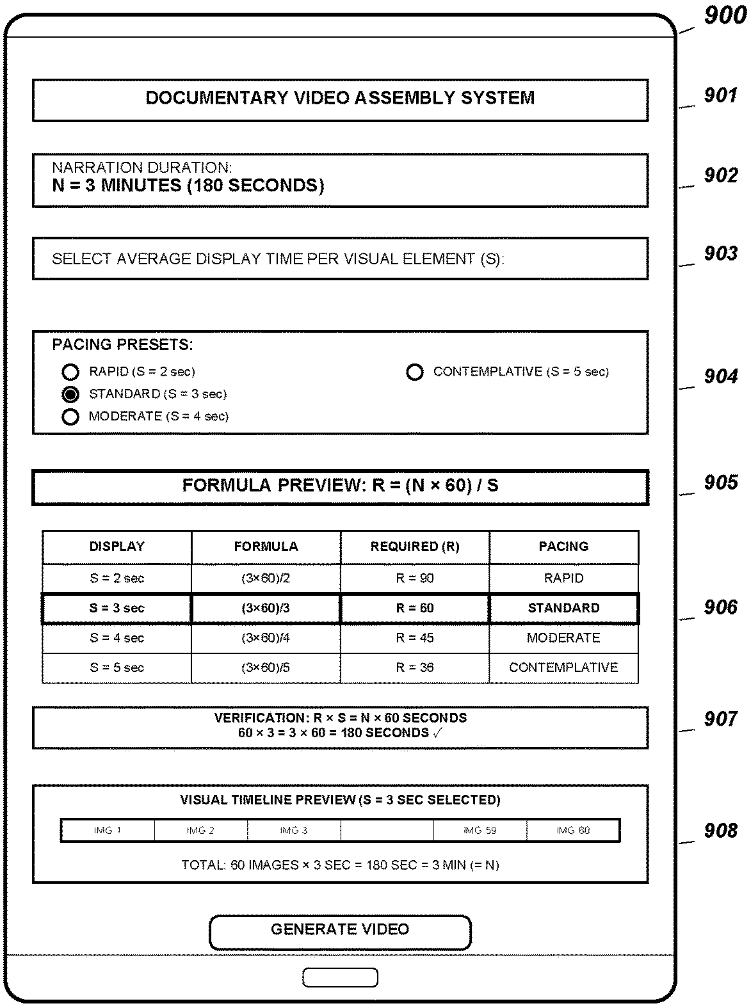
FIG. 9 illustrates a user interface display showing the formula preview calculation where different display time parameter values produce different required visual element counts for the same narration duration, according to an embodiment of the present invention.

FIG. 1 illustrates a network diagram for implementing an AI-based system (hereinafter, the system) for AI-assisted documentary-style video content creation. As shown, multiple user devices may be available to communicate with a server over a network, wherein the server may host the system. The system may have its own dedicated storage and processing capabilities. In another embodiment, the user device may be executing a digital assistant application, which can be a computer-based software application or a web application. The digital assistant application can communicate with, or form a portion of, the system.

In an embodiment, the server may be a remote server or a cloud server and is configured to access a plurality of databases to fetch industry-specific updates and information in real-time. The communication network pertains to either a wired or wireless system utilized for data transmission. The network facilitates seamless communication and data exchange between the user and the server.

In an embodiment, the system is configured to handle and analyze user queries received as inputs and ensures efficient interaction and information flow. The system is hosted on a server which multiple users can access through the web application on their user devices. To leverage the functionalities provided by the system, users are required to register with the web application from their respective user devices, providing necessary details, including personal information and contact details. Upon registration, users undergo authentication processes to verify their identity. Authorized users gain access to the full functionality of the system.

User Interface and Input Processing

In an embodiment, the system receives, from a user interface, one or more inputs comprising a source of user-selected written content input in text format, document file format, website address, or webpage address of content to be semantically summarized by AI and converted into a narrated video. Alternatively, one or more users may use the user interface to input text and web content addresses and search results into the Knowledge Base of text, images, video segments, graphics, modifiers, and search results for subsequent text-to-video conversions. The system also receives a user-selected average screen-time (number of seconds) per video image, and a user-selected quotation-frequency of visual-text quotes to be displayed in the video per minute or visual quotes to be displayed over every image or every preset number of images throughout the video.

Knowledge Base Construction and Maintenance

In an embodiment, the system generates an extensive database, systematically capturing and analyzing user inputs and content from diverse sources. By harnessing advanced AI algorithms, the system creates a nuanced understanding of content requirements, forming a comprehensive database that serves as the foundation for personalized video generation strategies.

In alternate embodiments, the AI-based system uses large language as well as semantic search-based algorithms to search known databases such as, but not limited to, major online news media, blogging databases, social media databases, legislative voting records, one or more governmental, educational, corporate, non-profit organization, and private online resources, one or more multimedia websites, and other official sources to generate a Knowledge Database. The purpose of the Knowledge Database is to comprehensively store data about images, video segments, and graphical elements with searchable keyword descriptions identified, described, categorized, and labeled with one or more attribute descriptors out of a plurality of unique descriptors, in a structured manner for displaying to users and generating video content by the system.

In an embodiment, the attribute descriptors are selected from, but not limited to, an action description, location setting, main subjects of the scene, mood and atmosphere, an event type, duration of the clip, time of day, camera angle and shot type, sound and music characteristics, color tone, lighting conditions, genre, language, special effects and visual enhancements, costumes and attire descriptions, character interaction, directional movement, pacing, weather conditions, historical context, theme, props, background elements, sound effects, speech patterns, cinematography style, narration presence, scene transition, editing style, symbolism, cultural references, and other differentiating image characteristics to improve accuracy of future image searches for video clips and images to be used in videos.

In a further embodiment, the LLM model assigns a predetermined value for each of the identified attribute descriptors to build the knowledge base to increase semantic-text to semantic-image and video segment matching accuracy.

Large Language Model Processing and Embedding Generation

In an embodiment, the system incorporates an In-Context Learning technique which facilitates the LLM to perform task-specific information extraction based on the provided examples and instructions. For in-context learning, the LLM may use examples from data stored in the Knowledge Base having data categories including subject-based data, people-based data, geospatial-location data, financial and transactional data, sensor data, non-numeric qualitative data, numeric quantitative data, administrative data, and behavioral data.

In a further embodiment, the LLM is configured to generate a text embedding by selecting semantically similar parts of the written content obtained from one or more inputs and providing contextual information related to the written content. The LLM encodes in the form of a vector representation and utilizes those parts for in-context learning whose semantic similarity with the selected topic is significant.

The LLM is further configured to create a draft text content based on user-chosen message topics and issues, already-written or published content, and content modifiers to personalize the draft text with subsequent draft content modifiers as needed by a user to create a personalized summarized draft text content approved to the personal satisfaction of the user.

AI Text-to-Audio Generation

In an embodiment, the system includes an AI text-to-audio generator combining information from the large language model, using unsupervised and supervised learning techniques, to create an AI-narrated audio file from the verbatim or summarized text content with a user-approved narration voice and narration type.

In an embodiment, the AI text-to-audio generator determines the length of the generated AI-narrated audio file. The total narration duration of the AI-narrated audio file represents the temporal extent of the complete narration from the beginning of the first spoken word to the end of the last spoken word.

Mathematical Formula for Visual Element Requirement Calculation

In a further embodiment, the processor is configured to determine the total narration duration and to calculate the required number of visual elements using a mathematical formula that expresses the division operation disclosed herein. Specifically, the required number of visual elements R is calculated as:

$$R=(N\times 60)/S$$

where R is the required number of visual elements (including images, graphics, and video segments), N is the total narration duration in minutes of the AI-narrated audio file, the factor 60 is the standard conversion from minutes to seconds, and S is the average display time in seconds per visual element as selected by the user or set by the system as a default value.

The formula R=(N×60)/S is a mathematical expression of the division operation whereby the system determines the narration length of the generated AI-narrated audio file and divides the audio file length in time by a predefined screen time interval to determine the number of images, graphics, or video sequences required for the creation of the AI-generated text-to-video file. The formula provides a deterministic calculation that yields an exact integer count (rounded to the nearest whole number) of visual elements required to fill the entire narration duration, thereby eliminating guesswork from the initial video assembly process.

In an alternate embodiment, the formula may be equivalently expressed in seconds as:

$$R=T/S$$

where T represents the total narration duration in seconds (equivalent to N×60), and S retains the same meaning of average display time per visual element in seconds. This seconds-based expression is mathematically identical to the minutes-based formula and produces the same result for any given narration duration and display time.

In yet another embodiment, the formula is generalized using a time-unit conversion factor K to accommodate narration durations expressed in any standard time unit:

$$R=(N\times K)/S$$

where K is a conversion factor that converts the narration duration N into seconds. When N is expressed in minutes, K equals 60. When N is expressed in hours, K equals 3600. When N is already expressed in seconds, K equals 1. The conversion factor K ensures that the numerator of the formula always represents total narration time in seconds, maintaining dimensional consistency with the display-time parameter S, which is always expressed in seconds.

In a further embodiment, the mathematical formula provides mathematical certainty in video pre-production planning. Before any visual element retrieval or assembly begins, the system calculates R to determine the exact number of visual elements that will be required for the completed video. This pre-retrieval calculation transforms what would otherwise be a subjective editorial judgment estimating how many images might be needed for a video of unknown final length into an objective, reproducible computation. A producer or automated system receiving the value R knows precisely how many visual elements must be sourced, retrieved, licensed, or created before the assembly process commences.

In an embodiment, the calculation of R enables pre-production resource planning. Once R is determined, the system can allocate retrieval resources, estimate knowledge base query loads, predict storage requirements, and schedule assembly pipelines proportional to the known element count. For example, if the narration is N=5 minutes long and the user selects S=4 seconds per image, the system calculates R=(5×60)/4=75, and the system knows before any image search begins that exactly 75 visual elements must be retrieved and assembled. This advance knowledge permits parallel retrieval operations, batch semantic searches, and efficient allocation of computational resources.

In a further embodiment, the formula ensures synchronization between the narration audio track and the visual element sequence. Because the total display time of all R visual elements, each displayed for an average of S seconds, equals R×S=(N×60/S)×S=N×60 seconds, which is exactly the total narration duration in seconds, the visual sequence is guaranteed to fill the narration duration completely. No gap or overlap exists between the end of the visual sequence and the end of the narration. This synchronization property is an inherent mathematical consequence of the formula and requires no additional timing adjustment algorithm.

Display Time Parameter: Extended Range and Cognitive Processing Basis

In an embodiment, the display time parameter S is user-selectable within a range of values. The system provides the user with the ability to select a display time parameter S within a range of 2 to 10 seconds per visual element. In a preferred embodiment, the default range presented to the user is 2 to 5 seconds, which corresponds to display durations commonly used in documentary-style and news-style video production. In another embodiment, the system permits the user to select values of S outside the default range, including values less than 2 seconds or greater than 10 seconds, to accommodate specialized production requirements.

The selection of the display time parameter S within the range of 2 to 5 seconds is informed by principles of cognitive processing in visual media consumption. At the lower bound of approximately 2 seconds per visual element, viewers are able to perceive and identify the primary subject matter of a still image or graphic, consistent with rapid-pacing techniques used in news montages, music videos, and promotional content where high visual energy is desired. At the upper bound of approximately 5 seconds per visual element, viewers have sufficient time to absorb contextual detail, read any embedded text, and form emotional associations with the depicted imagery, consistent with contemplative documentary pacing. The range of 3 to 5 seconds represents a conventional documentary pacing standard. The extended lower bound of 2 seconds accommodates faster-paced production styles while remaining above the threshold of approximately 1.5 seconds at which viewers can no longer reliably identify image content.

In another embodiment, the system presents the user with named pacing presets corresponding to different display time values. For example, a "rapid" preset may correspond to S=2 seconds, a "standard" preset may correspond to S=3 seconds, a "moderate" preset may correspond to S=4 seconds, and a "contemplative" preset may correspond to S=5 seconds. Each preset produces a different value of R for the same narration duration N, giving the user direct control over the visual density and pacing of the resulting video without requiring the user to perform any calculation.

In a further embodiment, the system displays to the user a preview calculation showing the effect of different S values on the required number of visual elements R before the user finalizes the selection. For a narration of N=3 minutes, the system may display that S=2 seconds requires R=90 visual elements, S=3 seconds requires R=60 visual elements, S=4 seconds requires R=45 visual elements, and S=5 seconds requires R=36 visual elements, enabling the user to make an informed selection based on available visual assets and desired production style.

Multi-Voice Narrative Processing

In an embodiment, the system is configured to process narrative content comprising a single narrator voice, multiple narrator voices, dialogue between two or more speakers, interview segments comprising questions and answers from distinct speakers, or any combination thereof. The narration duration N used in the formula R=(N×60)/S represents the total duration of the complete narrated audio file regardless of the number of distinct speakers contributing to that narration.

In a further embodiment, the system determines the total narration duration N by measuring the complete duration of the AI-narrated audio file from the beginning of the first spoken word to the end of the last spoken word, inclusive of all pauses, speaker transitions, and silence gaps between speakers. Where the narration comprises contributions from multiple speakers—such as an interviewer and an interviewee, or multiple participants in a panel discussion—the system aggregates the durations of all speaker contributions, including inter-speaker pauses, into a single total narration duration N. The formula R=(N×60)/S then operates on this aggregate duration to determine the total number of visual elements required for the complete multi-voice narration.

In yet another embodiment, the system receives narrative content in one or more of the following input formats: plain text documents, rich text documents, word processing documents, HTML pages, PDF documents, screenplay-formatted scripts, interview transcripts with speaker labels, dialogue scripts with character names, teleprompter-formatted text, podcast transcripts, news broadcast scripts, and structured data files containing speaker-attributed text segments. The system's text processing module parses the received content to identify the textual content to be converted into narrated audio, regardless of the input format, and passes the parsed content to the AI text-to-audio generator for narration synthesis.

In an embodiment, the system identifies distinct speakers within the narrative content by detecting speaker labels, character names, interviewer and interviewee designations, or other textual indicators that attribute portions of the narrative to different voices. For interview-format content, the system identifies question segments and answer segments. For dialogue-format content, the system identifies each character's lines. For hybrid content mixing narration with interview excerpts, the system identifies both the narrator portions and the quoted-speaker portions. The system may assign different AI-generated voices to different identified speakers based on user selection or automatic voice assignment.

In a further embodiment, when multiple AI-generated voices are assigned to different speakers within the narrative content, the AI text-to-audio generator produces a single composite narrated audio file containing all speaker contributions in sequence. The total duration N of this composite audio file includes the time attributable to each speaker plus any pauses inserted between speakers. The formula R=(N×60)/S is then applied to this composite narrated audio file to determine the total number of visual elements required, without distinguishing between visual elements assigned to different speakers' segments.

In another embodiment, the system identifies time-based transition points within the multi-voice narrative where one speaker's contribution ends and another speaker's contribution begins. These speaker-change transition points are detected by identifying the boundaries between speaker-attributed text segments in the input content, by detecting silence gaps between different AI-generated voices in the composite audio file, or by analyzing the text structure to identify speaker-label markers such as "Q:" and "A:" in interview transcripts or character names followed by colons in dialogue scripts. The identified speaker-change transition points may be used to align visual element transitions with speaker changes, as further described herein.

Transition Alignment at Natural Breaks in the Narration

In an embodiment, the system aligns transitions between consecutive visual elements at natural breaks in the narration. Natural breaks in the narration include sentence endings, where the narration completes a grammatical sentence and a brief pause occurs before the next sentence begins; paragraph boundaries, where the narration transitions from one thematic paragraph to another; speaker changes, where one speaker's contribution ends and another speaker's contribution begins in a multi-voice narrative; and pauses in the narrated audio, where the AI-generated narration includes a deliberate pause for emphasis, rhetorical effect, or structural division.

In a further embodiment, the system identifies natural break points by analyzing the textual structure of the narrative content before audio generation, identifying sentence-ending punctuation (periods, question marks, exclamation points), paragraph breaks, and speaker-label transitions. Additionally or alternatively, the system identifies natural break points by analyzing the generated narrated audio file to detect pauses, silence gaps, or changes in voice characteristics that correspond to structural boundaries in the narrative.

In an embodiment, the alignment of visual element transitions to natural breaks operates as an optional refinement to the base formula $R=(N\times60)/S$. The base formula determines the total number of visual elements R and the average display time S per element. The transition alignment module then adjusts the individual display times of visual elements so that transitions between consecutive visual elements coincide with detected natural break points in the narration, while maintaining the overall constraint that the sum of all individual display times equals the total narration duration $N\times60$ seconds. Where a natural break falls near but not exactly at an S-second interval, the system may slightly extend or shorten the display time of the current visual element to align the transition with the natural break, and correspondingly adjust the display time of one or more adjacent visual elements to preserve the total duration constraint.

In yet another embodiment, the transition alignment operates on a best-effort basis, aligning visual transitions to the nearest natural break when a break exists within a tolerance window of the nominal S-second transition point. When no natural break exists within the tolerance window, the transition occurs at the nominal S-second point. The tolerance window may be a fixed value, for example plus or minus 0.5 seconds from the nominal transition point, or a proportional value, for example plus or minus 15 percent of S.

Variable Display Time with Global Duration Constraint

In an embodiment, the system permits local adjustment of the display time parameter S for individual visual elements while maintaining the global constraint imposed by the formula $R=(N\times60)/S$. The user or the system's automated transition alignment module may increase the display time of a particular visual element beyond the nominal S seconds—for example, to hold a particularly important or complex image on screen longer—and compensate by decreasing the display time of one or more adjacent visual elements by a corresponding amount. The sum of all individual display times across the R visual elements remains equal to $N\times60$ seconds (the total narration duration), thereby preserving synchronization between the visual sequence and the narration audio track.

In a further embodiment, the system enforces minimum and maximum bounds on local display time adjustments. No individual visual element may be displayed for less than a minimum threshold, for example 1.5 seconds, to ensure viewers can perceive the content. No individual visual element may be displayed for more than a maximum threshold, for example $3\times S$ seconds, to prevent visual stagnation. These bounds ensure that local adjustments do not create visual elements with excessively short or excessively long display times, even when the overall $R\times S=N\times60$ constraint is satisfied.

Semantic-Emotional Analysis for Visual Element Selection

In a further embodiment, the system comprises a semantic-emotional analysis subsystem configured to enhance the selection of visual elements from the knowledge base or from external multimedia databases by analyzing the emotional tone, narrative context, and persuasive intent of the narration text corresponding to each visual element position in the video timeline.

In an embodiment, the semantic-emotional analysis subsystem comprises an emotional tone extraction module configured to analyze the narration text associated with each time segment of the video and to extract one or more emotional tone descriptors. The emotional tone extraction module processes the narration text using the large language model to identify emotional characteristics such as urgency, compassion, outrage, hope, fear, celebration, mourning, humor, irony, determination, and neutrality. The extracted emotional tone descriptors are associated with the corresponding time segment and are used as additional search parameters when the image search engine queries the knowledge base or external multimedia databases for visual elements to fill that time segment.

In another embodiment, the semantic-emotional analysis subsystem comprises a visual emotion mapping module configured to match extracted emotional tone descriptors to visual characteristics of candidate images and video segments stored in the knowledge base. The knowledge base stores visual elements that are labeled with attribute descriptors including mood and atmosphere descriptors. The visual emotion mapping module compares the emotional tone descriptors extracted from the narration text to the mood and atmosphere attribute descriptors of candidate visual elements and selects visual elements whose mood and atmosphere attributes are congruent with the narration's emotional tone for that time segment.

In a further embodiment, the semantic-emotional analysis subsystem assigns a relevance score to each candidate visual element based on multiple matching criteria. The relevance score may incorporate a hierarchical weighting scheme wherein different categories of matching criteria receive different weights. In one embodiment, the weighting scheme assigns a base weight W to literal-content matches (where the visual element depicts a subject explicitly mentioned in the narration text), a weight of 2W to contextual-relevance matches (where the visual element depicts a subject contextually related to the narration's topic), a weight of 3W to emotional-tone matches (where the visual element's mood and atmosphere matches the narration's emotional tone), and a weight of 4W to narrative-arc matches (where the visual element supports the overall storytelling progression of the documentary). The total relevance score for a candidate visual element is the sum of all applicable weighted matches, and the system selects the candidate with the highest total relevance score for each visual element position.

In yet another embodiment, the hierarchical weighting values (W, 2W, 3W, 4W) are configurable by the user or by system presets corresponding to different production styles. For a news-style production prioritizing factual accuracy, the weighting may be adjusted to emphasize literal-content matches. For an emotional documentary style, the weighting may be adjusted to emphasize emotional-tone matches. The hierarchical weighting scheme permits the same knowledge base and the same formula-derived element count R to produce visually distinct videos depending on the selected weighting profile.

In an embodiment, the semantic-emotional analysis subsystem further comprises a persuasion scoring module configured to analyze the narration text to identify persuasive rhetorical devices including calls to action, comparative claims, statistical evidence, testimonial citations, and emotional appeals. The persuasion scoring module assigns a persuasion intensity score to each time segment of the narration, and the visual element selection process may preferentially select high-impact visual elements such as close-up portraits, dramatic landscapes, or infographic overlays for time segments with high persuasion intensity scores.

In a further embodiment, the semantic-emotional analysis subsystem identifies storytelling patterns within the narration text, including narrative introduction sections, rising-tension sections, climax sections, resolution sections, and conclusion sections. The system adjusts visual element selection and display time pacing to reflect these storytelling patterns. For example, introduction sections may use wider establishing shots, rising-tension sections may use increasingly tight framing and faster transitions (shorter individual display times within the local adjustment framework described herein), and climax sections may hold on a single powerful image for an extended display time.

Scene Grouping and Scene Duration Calculation

In an embodiment, the system groups consecutive visual elements into semantic scenes based on content analysis of the narration text. A semantic scene comprises a contiguous sequence of visual elements that correspond to a thematically unified segment of the narration. Scene boundaries are identified at points where the narration text transitions from one topic, location, time period, speaker focus, or narrative theme to another. The system identifies scene boundaries by analyzing the narration text using the large language model to detect topic shifts, by detecting speaker changes in multi-voice narratives, or by identifying explicit structural markers in the input content such as section headings, chapter breaks, or scene descriptions.

In a further embodiment, the system calculates a scene duration for each identified semantic scene. The scene duration is determined by multiplying the count of visual elements within the scene by the display time parameter S. For example, if a scene contains 8 visual elements and S=4 seconds, the scene duration is 8×4=32 seconds. The sum of all scene durations across the entire video equals N×60 seconds (the total narration duration), because the total count of visual elements across all scenes equals R, and R×S=N×60.

In yet another embodiment, scene duration information is used to coordinate background music selection and synchronization, as further described herein. Scene duration information may also be used to select visual transition effects appropriate to scene boundaries (such as fade-to-black or dissolve effects between scenes) versus within-scene transitions (such as cut or cross-dissolve effects between visual elements within the same scene).

Music Synchronization Derived from Narration Duration

In an embodiment, the total narration duration N serves as a master timing parameter that governs not only the visual element count R but also the selection and synchronization of background music for the video. The system selects background music tracks or music segments whose durations match or can be trimmed to match the total narration duration of N×60 seconds, ensuring that the music begins with the narration and concludes with the narration without abrupt cutoff or silence gaps.

In a further embodiment, the system uses the scene duration information to select music segments whose phrase lengths correspond to individual scene durations. A music phrase is a musically coherent segment, typically 4, 8, 16, or 32 bars in length. The system analyzes the music track to identify phrase boundaries and selects music segments whose phrase durations approximate the calculated scene durations, so that musical transitions coincide with scene boundaries in the video. This coincidence of musical and visual transitions creates a perception of intentional choreography between the music and the visual narrative.

In another embodiment, the system calculates the number of musical bars required for the video based on the total narration duration N and a standard tempo. For a musical tempo of B beats per minute with M beats per bar, the total number of bars in the video is (N×B)/M. The system may use this calculation to select music tracks with compatible structures or to generate music loops of the appropriate length.

In yet another embodiment, the system aligns music phrase boundaries with visual element transitions at S-second intervals. Where the music phrase length and the display time parameter S are not exact multiples, the system selects music with phrase lengths that are close multiples of S, or adjusts the music tempo slightly within perceptually acceptable limits (for example, plus or minus 5 percent of the original tempo) to achieve alignment between music phrase boundaries and visual element transitions.

In a further embodiment, the unified timing architecture ensures that the narration duration N functions as the single governing parameter from which all timing relationships in the video are derived. From N and the user-selected S, the system calculates R (the number of visual elements). From R and the scene structure, the system determines scene durations. From scene durations and music analysis, the system selects and synchronizes background music. This cascading derivation of all timing parameters from a single master value N ensures internal temporal consistency across all layers of the video—narration, visual elements, text overlays, and music without requiring manual adjustment of individual timing relationships.

Documentary Format Taxonomy

In an embodiment, the system supports the creation of documentary-style videos in a plurality of documentary production formats. The supported documentary production formats include, but are not limited to:

(a) Narrator format, in which a single narrator voice delivers the entire narration and all visual elements are selected to illustrate the narrator's verbal content. This format is suitable for news reports, educational explainers, and authored commentary.

(b) Interview format, in which the narrative content comprises questions posed by an interviewer and answers provided by one or more interviewees. The system assigns distinct AI-generated voices to the interviewer and interviewee(s) and selects visual elements that are relevant to the subject matter of each answer segment. Visual elements during question segments may show the interviewee or contextual establishing shots.

(c) Dialogue format, in which two or more speakers engage in conversation, debate, or discussion. The system identifies each speaker's contributions and may select visual elements specific to each speaker's perspective or argument.

(d) Archival and montage format, in which the visual elements are primarily sourced from historical, archival, or stock photography and footage collections, and the narration provides context, commentary, or analysis of the depicted visual content.

(e) Hybrid format, combining two or more of the above formats within a single video. For example, a hybrid documentary may begin with a narrator introduction, transition to an interview segment, include archival montage sequences, and conclude with narrator commentary. The formula R=(N×60)/S applies to the total narration duration across all format segments, and the scene grouping mechanism identifies the boundaries between format segments.

Mixed Media Assembly

In an embodiment, the visual elements counted by the formula R=(N×60)/S include both still images and video segments. A still image displayed for S seconds and a video segment of S seconds duration each count as one visual element toward the total R. The system treats still images and video segments as co-equal visual media types for purposes of the formula calculation, and R represents the total count of all visual media elements regardless of whether each individual element is a still image, a graphic, or a video segment.

In a further embodiment, the system may select a mix of still images and video segments to satisfy the calculated requirement of R visual elements. The selection of still images versus video segments for each position in the visual sequence is determined by the image search engine based on the availability of matching content in the knowledge base, the semantic relevance of available still images versus available video segments to the corresponding narration text, and user preferences for the ratio of still images to video segments. The formula R=(N×60)/S operates identically regardless of the media type composition, and the total assembled duration of all R visual elements (whether still or moving) equals N×60 seconds.

In yet another embodiment, when a video segment stored in the knowledge base has a duration different from S seconds, the system trims the video segment to S seconds for use as a single visual element, or, if the video segment is substantially longer than S seconds, divides the video segment into multiple S-second portions, each of which counts as a separate visual element toward R. When a video segment is shorter than S seconds, the system may extend it by holding on the final frame, looping the segment, or supplementing with a complementary still image to fill the S-second display time.

Speaker-Specific Semantic Matching

In an embodiment, the system extracts semantic search terms from the narration text to capture both the literal meaning of the narrated words and the narrative context of the segment in which those words appear. For each visual element position in the video timeline, the system analyzes the narration text corresponding to the time window of that position and generates one or more semantic search queries that reflect the explicit topics mentioned in the text (literal meaning) as well as the broader thematic context, background setting, and implied subject matter (narrative context).

In a further embodiment, when the narration comprises contributions from multiple identified speakers, the system performs speaker-specific semantic matching. The system identifies which speaker is active during each time segment of the narration and generates semantic search queries that reflect the content, perspective, and context associated with that particular speaker. For example, in an interview-format video, visual elements selected for the interviewer's question segments may include contextual or establishing imagery, while visual elements selected for the interviewee's answer segments may include imagery directly illustrative of the answer's subject matter. This speaker-aware visual selection ensures that the retrieved visual elements are contextually appropriate to each speaker's contribution.

Unified Timing Architecture and Mathematical Determination

In a further embodiment, the system implements a unified timing architecture in which the total narration duration N serves as the master timing parameter from which all other temporal parameters of the video are mathematically derived. The unified timing architecture operates as follows:

(a) The narration duration N is determined from the generated AI-narrated audio file.

(b) The required number of visual elements R is calculated using R=(N×60)/S.

(c) The visual element sequence is assembled with R elements, each displayed for a nominal S seconds.

(d) Scene boundaries are identified and scene durations are calculated as described herein.

(e) Background music is selected and synchronized to the narration duration and scene structure as described herein.

(f) Text overlays are timed in coordination with the visual element sequence using quotation-frequency parameters.

(g) Transition effects between visual elements are applied at S-second intervals, optionally aligned to natural breaks as described herein.

Each of these timing relationships flows deterministically from the single master parameter N and the user-selected display time S, creating a coherent temporal structure across all multimedia layers of the video without requiring manual synchronization.

In an embodiment, the unified timing architecture provides synchronized timing between the narration audio and visual element progression by ensuring that each visual element occupies a defined time window within the narration timeline. The first visual element occupies the time window from 0 to S seconds, the second visual element occupies the time window from S to 2S seconds, and so on through the R-th visual element, which occupies the time window from (R−1)×S to R×S=N×60 seconds. This deterministic assignment of time windows ensures that each visual element is displayed in temporal alignment with the narration content that was authored to accompany it.

Image Search and Semantic Matching

In an embodiment, the image search engine uses the LLM model with in-context learning to generate search keywords for searching one or more multimedia databases for at least one of an image, a graphic, or a video segment that is visually and semantically relevant to the contextual information and meaning of the written content.

In yet another embodiment, the LLM model includes an automated multimedia retrieval engine for parsing one or more multimedia websites, using Large Language Models, and retrieving images, graphics, and video segments, wherein the multimedia retrieval engine scrapes various platforms and direct links for effective image processing.

In a further embodiment, the AI-based video generator automatically selects images, video segments, and graphical elements that convey a narrative aligned with the emotional and visual theme or tone selected by the user and relevant to the contextual information of the created message.

Text-to-Graphics Overlay Generation

In one embodiment, the AI text-graphics generator determines the length of the generated AI-narrated audio file and divides the audio file length in time by a user-chosen quotation-frequency factor selected from (a) the number of graphical text quotes to display per minute, or (b) display one text quote on every image, or (c) on every predetermined number of images in the video, to determine the timing and number of word-phrases and quotes needed to be overlayed and displayed in sync to the narrated video.

Video Clip Library and Descriptor System

In an embodiment, the process of extracting and categorizing scenes of a predetermined time by the LLM which are to be stored in the knowledge base includes video access and downloading, video segmentation into predetermined time-length clips, scene detection using advanced AI tools and frameworks to isolate specific scenes and evaluate each image and scene for one or more descriptors, descriptor assignment with scoring of each descriptor on a predetermined intensity scale, time code identification for specific events, clip extraction and saving, library and content management system integration, and text-to-video matching using Large Language Models to analyze input text and match keywords and phrases with video clips in the database based on the descriptors.

Dynamic Advertising Integration

In an embodiment, the system further includes an AI-based dynamic ad generator for the dynamical selection of sponsor-related advertisements that match the contextual information of the written content and incorporate the advertisements in the AI-generated video. The AI-based dynamic ad generator creates placeholders within the AI-generated video during synchronization for incorporating sponsor-related advertisements. The placeholders may be generated at a predetermined time interval within the AI-generated video, preferably at the beginning, the middle, and the end of the AI-generated video.

Viewer Rewards System

In an alternate embodiment, the system is configured to proportionately reward the activities of registered users for the amount of time they spend watching text-to-videos produced by the present invention in the form of rewards points earned for every minute of video played, or every partial or complete video viewed, which rewards points are redeemable for local retail store discounts, coupons, and rebates at local businesses that support their local communities by sponsoring educational text-to-videos.

Fact-Check and Truth-Reliability Assessment

In yet another aspect, a computer-implemented method for analyzing integrity of information using the AI-based system interfaced with a Knowledge Base over a network is disclosed. The method comprises receiving one or more user inputs, utilizing a large language model with in-context learning to process contextual information from the received inputs, comparing the summarized text content using an AI evaluator that includes an LLM model against a predetermined list of truth descriptors, assigning an integrity score based on the comparison results, and providing feedback on the integrity of the summarized draft text to the user based on the generated integrity score.

In an embodiment, the predetermined list of truth descriptors identifies information and categorizes said information into one or more categories selected from fake for entirely fabricated information, false for information contradicting verified records, misleading for information twisted based on fact, unproven for lack of evidence, inaccurate for inaccuracies in data, context-required for lacking supporting contextual information, unsubstantiated for being based on rumors, partially true for having a mix of truth and fiction, overgeneralization for broad information lacking specific evidence, speculative for being based on conjecture, and anachronistic for being based on evidence from a wrong time period.

In a further embodiment, the step of comparing includes scanning websites and summarizing information from said websites to identify key rumors, conspiracy stories, and lies by evaluating against one or more reliable sources, including governmental, academic, and verified media outlets, to create a list of blacklisted websites and storing the Knowledge Base with corresponding truth descriptors.

GENERAL IMPLEMENTATION NOTES

While for purposes of simplicity of explanation, the illustrated methodologies are shown and described as a series of blocks and steps, it is to be appreciated that the methodologies are not limited by the order of the blocks, as some blocks can occur in different orders and concurrently with other blocks from that shown and described. Moreover, less than all the illustrated blocks may be required to implement an example methodology. Blocks may be combined or separated into multiple components. Furthermore, additional and alternative methodologies can employ additional blocks not illustrated.

The methodology and techniques described for the exemplary embodiments can be performed using a machine or other computing device within which a set of instructions when executed, may cause the machine to perform any one or more of the methodologies discussed above. In some embodiments, the machine operates as a standalone device. In some embodiments, the machine may be connected using a network to other machines. In a networked deployment, the machine may operate in the capacity of a server or a client-user machine in a server-client-user network environment, or as a peer machine in a peer-to-peer or distributed network environment.

Moreover, although the present invention and its advantages have been described in detail, it should be understood that various changes, substitutions, and alterations can be made herein without departing from the invention as defined by the appended claims. Moreover, the scope of the present application is not intended to be limited to the particular embodiments of the process, machine, manufacture, and composition of matter, means, methods, and steps described in the specification. Accordingly, the appended claims are intended to include within their scope such processes, machines, manufacture, compositions of matter, means, methods, or steps, presently existing or later to be developed that perform substantially the same function or achieve substantially the same result as the corresponding embodiments described herein.

What is claimed is:

1. A computer-implemented system for generating narration-driven video content from textual input, comprising:

(a) a user interface configured to receive (i) textual input and (ii) a display time parameter S specifying an average display time in seconds per visual element;

(b) a text-to-audio generator configured to generate, from the textual input, a narration audio track having a total narration duration T;

(c) a duration analyzer configured to determine the total narration duration T;

(d) a controller configured, before retrieving visual elements, to compute an integer required number R of visual elements from T and S by dividing T by S and converting a result of the division to the integer required number R;

(e) a retrieval engine configured to, responsive to the computed integer required number R, retrieve R visual elements from one or more multimedia repositories using one or more search parameters derived from the textual input or narration-aligned text segments; and (f) a video compositor configured to generate a video output by (i) sequencing the R retrieved visual elements and (ii) synchronizing the sequence with the narration audio track according to a timing plan that defines R display intervals that collectively span the total narration duration T.

2. The system of claim 1, wherein computing R comprises applying a formula selected from:

(i) R=T/S where T is in seconds;

(ii) R=(N×60)/S where N is the total narration duration in minutes; or (iii) R=(N×K)/S where K is a time-unit conversion factor equal to 60 when N is in minutes, 3600 when N is in hours, and 1 when N is in seconds;

and wherein converting to the integer required number R comprises applying at least one of rounding to a nearest integer or applying a ceiling function.

3. The system of claim 1, wherein S is user-selectable within a range of 2 to 10 seconds per visual element, and wherein the user interface presents pacing presets that set S to predetermined values including at least two of: 2 seconds, 3 seconds, 4 seconds, and 5 seconds.

4. The system of claim 1, further comprising a text processing subsystem configured to extract semantic search parameters from the textual input or narration-aligned text segments, and wherein the text processing subsystem comprises at least one of: a pretrained large language model, an embedding model, or a classifier that outputs semantic tags used by the retrieval engine.

5. The system of claim 1, wherein the text-to-audio generator is configured to generate the narration audio track as a composite narration including multiple speakers, and wherein T includes durations of all speaker segments and inter-speaker pauses.

6. The system of claim 1, wherein the timing plan comprises a machine-readable timeline data structure that includes, for each visual element index i from 1 to R, at least: (i) a start time, (ii) an end time, and (iii) an identifier of a retrieved visual element assigned to the interval from the start time to the end time.

7. The system of claim 1, wherein the video compositor is configured to align at least a subset of transitions between consecutive display intervals to detected natural breakpoints in the narration, the natural breakpoints comprising at least one of sentence boundaries, paragraph boundaries, or speaker changes, by:

(a) defining nominal transition times at integer multiples of S seconds; (b) detecting natural breakpoints in the narration audio or narration-aligned text; and (c) when a detected natural breakpoint occurs within a tolerance window of a nominal transition time, assigning the transition to the detected natural breakpoint, and otherwise assigning the transition to the nominal transition time.

8. The system of claim 7, wherein the tolerance window is set as (i) a fixed value of 0.5 seconds or (ii) a proportional value of 15% of S.

9. The system of claim 1, wherein the timing plan defines display interval durations that include at least one interval duration different from S, subject to a constraint that a sum of all R display interval durations equals T, and wherein each display interval duration is bounded by a minimum duration of 1.5 seconds and a maximum duration of 3×S.

10. The system of claim 1, further comprising a semantic-emotional analysis subsystem configured to output emotional tone descriptors for narration-aligned text segments and to provide the emotional tone descriptors as additional retrieval constraints to the retrieval engine.

11. The system of claim 10, wherein the semantic-emotional analysis subsystem assigns a relevance score to each visual element in a candidate set of visual elements considered for selection, using a hierarchical weighting scheme in which:

(a) a literal-content match contributes a base weight W;

(b) a contextual-relevance match contributes 2W;

(c) an emotional-tone match contributes 3W; and (d) a narrative-arc match contributes 4W;

wherein W is a predetermined positive weight value stored in memory, and wherein the retrieval engine selects, for each of the R positions, the visual element having a highest relevance score.

12. The system of claim 1, further comprising a persuasion and structure analyzer configured to assign, for narration-aligned segments, at least one of (i) a numeric persuasion intensity score or (ii) a narrative phase label selected from a predetermined set of phase labels, and wherein the retrieval engine conditions visual element selection or pacing adjustments on the numeric persuasion intensity score or the narrative phase label.

13. The system of claim 1, wherein the controller groups consecutive display intervals into semantic scenes and the system synchronizes background music to the scenes by:

(a) selecting a background music track having a duration matched to T; and (b) aligning at least one music phrase boundary to at least one scene boundary;

and wherein the system calculates a number of musical bars as (N×B)/M, where N is narration duration in minutes, B is beats per minute, and M is beats per bar.

14. The system of claim 1, wherein the retrieved visual elements comprise a mix of still images and video segments, and wherein a still image assigned to a display interval and a video segment assigned to a display interval each count as one visual element toward R.

15. A computer-implemented method for generating narration-driven video content from textual input, comprising:

(a) receiving textual input and a display time parameter S specifying an average display time in seconds per visual element; (b) generating, from the textual input, a narration audio track having a total narration duration T; (c) determining the total narration duration T; (d) before retrieving visual elements, computing an integer required number R by dividing T by S; (e) retrieving R visual elements from one or more multimedia repositories using one or more search parameters derived from the textual input or narration-aligned text segments; (f) generating a timing plan that defines R display intervals that collectively span T; and (g) composing a video output by sequencing the R visual elements according to the timing plan while synchronizing the sequence with the narration audio track.

16. The method of claim 15, wherein computing R comprises applying a formula selected from: R=T/S, R=(N×60)/S, or R=(N×K)/S, and further comprising, prior to retrieving the R visual elements, allocating retrieval or assembly resources based on the computed R.

17. The method of claim 15, further comprising presenting, prior to composing the video output, a preview that displays a computed value of R for at least two different candidate values of S.

18. The method of claim 15, further comprising aligning transitions between consecutive display intervals to natural breakpoints by shifting a transition from a nominal multiple-of-S time to a detected natural breakpoint when the natural breakpoint occurs within a tolerance window, and otherwise leaving the transition at the nominal multiple-of-S time, and further comprising enforcing a global constraint that a sum of all interval durations equals T.

19. The method of claim 15, wherein generating the narration audio track comprises generating a composite narration including at least two speakers, and wherein T includes durations of all speaker segments and inter-speaker pauses.

20. A computer-implemented system for generating a unified timing architecture for a narration-driven video, comprising:

(a) a processor and memory storing instructions that cause the processor to:

(i) generate or receive a narration audio track having a total duration T;

(ii) receive a display time parameter S;

(iii) compute an integer required number R from T and S;

(iv) generate a machine-readable timing plan that (A) defines R display intervals whose durations sum to T and (B) assigns, to each interval, one or more time-governed media events comprising at least a visual event; and (v) drive assembly of a composite video output using the timing plan so that narration, visual events, and at least one additional layer selected from text overlays or background music are time-governed by the same timing plan.

21. The system of claim 20, wherein the timing plan includes per-interval start and end times and is emitted as a timeline data structure consumable by a rendering pipeline.

22. The system of claim 20, wherein the timing plan includes scene boundaries derived from semantic segmentation of narration-aligned text and aligns a background music structure to at least a subset of the scene boundaries.

23. The system of claim 20, wherein the timing plan aligns at least a subset of visual transitions to detected natural breakpoints within a tolerance window of nominal transition times.

24. The system of claim 20, wherein visual elements in a candidate set of visual elements considered for selection are ranked using a hierarchical weighting scheme with a predetermined positive base weight W, and wherein the system selects a ranked visual element for assignment to each of the R display intervals based on the ranking.

25. The system of claim 1, wherein the text-to-audio generator is configured to generate the narration audio track in a selected one of a plurality of narrative formats comprising at least: (i) a narrator format with a single speaker voice; (ii) an interview format with questions and answers from distinct speakers; (iii) a dialogue format with two or more speakers in conversation; (iv) an archival format including historical source content and commentary; and (v) a hybrid format combining two or more of the foregoing formats within a single video; and wherein T encompasses the total duration across all format segments regardless of the selected narrative format.

26. The method of claim 15, wherein generating the narration audio track comprises generating the narration audio track in a selected one of a plurality of narrative formats comprising at least: (i) a narrator format with a single speaker voice; (ii) an interview format with questions and answers from distinct speakers; (iii) a dialogue format with two or more speakers in conversation; (iv) an archival format including historical source content and commentary; and (v) a hybrid format combining two or more of the foregoing formats within a single video; and wherein T encompasses the total duration across all format segments regardless of the selected narrative format.

* * * * *